(12) United States Patent  
Bobenhausen

(10) Patent No.: US 8,628,118 B2  
(45) Date of Patent: Jan. 14, 2014

(54) SYSTEM, METHOD, AND APPARATUS FOR MULTIPLE APPLICATION FITTING

(76) Inventor: Larry F. Bobenhausen, St. Petersburg, FL (US)

( * ) Notice: Subject to any disclaimer, the term of this patent is extended or adjusted under 35 U.S.C. 154(b) by 254 days.

(21) Appl. No.: 13/110,373

(22) Filed: May 18, 2011

(65) Prior Publication Data

US 2012/0292900 A1  Nov. 22, 2012

(51) Int. Cl.  
*F16L 33/01*  (2006.01)

(52) U.S. Cl.  
USPC ........... 285/239; 285/242; 285/252; 285/259; 285/351

(58) Field of Classification Search  
USPC ............. 285/148.16, 240, 242, 332, 332.2, 285/332.3, 252, 253, 259, 239, 347, 351  
See application file for complete search history.

(56) References Cited

U.S. PATENT DOCUMENTS

| | | | | |
|---|---|---|---|---|
| 4,522,435 A | * | 6/1985 | Miller et al. | 285/256 |
| 5,378,023 A | * | 1/1995 | Olbrich | 285/24 |
| 5,558,375 A | * | 9/1996 | Newman | 285/23 |
| 6,010,162 A | | 1/2000 | Grau et al. | |
| 6,206,048 B1 | | 3/2001 | Bobenhausen | |
| 6,460,897 B1 | * | 10/2002 | Manuli | 285/256 |
| 2004/0164550 A1 | * | 8/2004 | Knowles et al. | 285/320 |
| 2006/0220378 A1 | * | 10/2006 | Li et al. | 285/242 |
| 2010/0148490 A1 | | 6/2010 | Bobenhausen | |

FOREIGN PATENT DOCUMENTS

| | | | | |
|---|---|---|---|---|
| GB | 2177769 A | * | 1/1987 | F16L 21/06 |
| WO | WO 95/33157 | | 12/1995 | |

* cited by examiner

*Primary Examiner* — James Hewitt  
(74) *Attorney, Agent, or Firm* — Larson & Larson, P.A.; Frank Liebenow; Justin P. Miller

(57) ABSTRACT

A removable and reusable multiple application fitting is disclosed that enables removal of the hose without significant damage to the hose. The removable and reusable multiple application fitting properly seals with hoses made of only one compound, such as rubber, as well as hoses of multiple compounds with or without linings, such as a rubber hose with a plastic lining. The multiple application fitting has a taper step and o-ring step to guide a hose over an installed o-ring to prevent the o-ring from being displaced during installation. The multiple application fitting is versatile and in some embodiments is used with hoses that require o-rings, and in other embodiments used with hoses that do not.

11 Claims, 4 Drawing Sheets

SYSTEM, METHOD, AND APPARATUS FOR MULTIPLE APPLICATION FITTING

FIELD

This invention relates to a fitting device for connecting a fitting interface end to a hose and more particularly to a fitting device that is used to connect multiple types of hoses, with the hose and the fitting device being removable and reusable.

This application is related to application Ser. No. 12/336, 723 to Bobenhausen, now U.S. Pat. No. 8,342,578, issued Jan. 1, 2013 and to application Ser. No. 12/634,882 to Bobenhausen now U.S. Pat. No. 8,302,283, issued Nov. 6, 2012.

BACKGROUND

Barbed hose fittings have long existed in the prior art. Such fittings come in all shapes and sizes, with many materials and applications. But barbed fittings have many disadvantages. When the hose is compressed on top of the barbs, the sharp and pointed barbs often damage the integrity of the hose, compromising the integrity of the coupling seal, potentially causing leakage. Barbed fittings are difficult to remove once installed in a hose and often cannot be taken out of the hose without causing damage. Additionally, the sharp edge of a barb often causes a scraping on the inside of the hose during application. For hose and fitting combinations with high pressure carrying capability, installation may require tools.

One attempted solution is present in U.S. Pat. No. 6,010, 162 to Grau et al. This patent discloses a hose nipple with at least one circular groove with o-ring. This device uses deeper grooves to hold the o-ring, with "protection and support diameters being larger than said O-ring seal diameter." (Grau, Col. 6, II 48-49). The centerline of the o-ring is below the surface of the hose nipple, resulting in over half of the o-ring being enclosed by the nipple. This results in a less-effective seal because only a small portion of the o-ring is exposed and in contact with the sealing surface of the hose. This device further includes "barbed serrations" which tend to damage the inner layer of the hose. Finally, this device requires the use of clamps carefully placed over the o-rings in order to properly seal. Misplaced clamps, or the use of ferrules, will result in improper compression, and a poor seal.

Another attempted solution is present in U.S. Pat. No. 6,460,897 to Manuli. This patent discloses a connector for flexible pipes (i.e. hoses), particularly for cooling systems. The connector uses a sealing ring that is wider than it is thick (known in the industry as a "D-ring") to avoid rolling/displacing the sealing ring when a hose is slid over the connector. This, therefore, requires the use of non-standard o-rings to prevent the o-ring from being displaced by the leading edge of the hose during installation. Additionally, the use of a D-ring spreads out the force of the ring against the inside of the hose, decreasing the pressure against the hose, making it more difficult to achieve a high pressure seal.

What is needed is a hose fitting system that seals a hose to a fitting interface end without the use of barbs, providing a strong seal for both lined and unlined hose.

SUMMARY

A removable and reusable fitting is disclosed that enables removal of the hose without significant damage to the hose. The removable and reusable fitting properly seals with hoses made of only one compound, such as rubber, as well as hoses of multiple compounds with or without linings, such as a rubber hose with a plastic lining.

In one embodiment, a system is disclosed including a multiple application fitting for joining a hose to a fitting interface end, the multiple application fitting comprising a hollow cylinder, the hollow cylinder having an inside surface, an outside surface, a distal end, and a proximal end, the distal end having a fitting interface end, the proximal end having a taper, the taper having a taper step and an insertion surface, one or more o-ring grooves, each o-ring groove circumferentially encircling the hollow cylinder, each o-ring groove having a groove depth, a groove diameter, and an installed o-ring diameter; and one or more o-ring groove depressions, each o-ring groove depression having a depression diameter, and the o-ring groove depressions being a portion of the outer surface at both sides of the o-ring groove.

In another embodiment, a method of joining a hose to a fitting interface end, the method comprising providing a multiple application fitting, the multiple application fitting having, a hollow cylinder, the hollow cylinder having an inside surface, an outside surface, a distal end, and a proximal end, the distal end having a fitting interface end, the proximal end having a taper, the taper having a taper step and an insertion surface, one or more o-ring grooves, each o-ring groove circumferentially encircling the hollow cylinder, each o-ring groove having a groove depth, a groove diameter, and an installed o-ring diameter, and one or more o-ring groove depressions, each o-ring groove depression having a depression diameter, and the o-ring groove depressions being a portion of the outer surface at both sides of the o-ring groove, providing an end of the hose cut at approximately 90 degrees, placing at least one clamp loosely over the hose, pushing the end of the hose over the hollow cylinder, the end of the hose being pushed past the o-ring groove, positioning the clamp on the hose, over the o-ring groove, and tightening the clamp, thereby compressing the hose against the outside surface of the hollow cylinder.

In another embodiment, a multiple application fitting for joining a hose to a fitting interface end, the multiple application fitting comprising a hollow cylinder, the hollow cylinder having an inside surface, an outside surface, a distal end, and a proximal end, the distal end having a fitting interface end, the proximal end having a taper, the taper having a taper step and an insertion surface, the taper step having a taper step diameter one or more o-ring grooves, each o-ring groove circumferentially encircling the hollow cylinder, the o-ring grooves having a groove depth, groove diameter, and an installed o-ring diameter one or more o-ring groove depressions, each o-ring groove depression having an depression diameter, and the o-ring groove depressions being a portion of the outer surface at both sides of the o-ring groove and one or more o-ring steps on the outside surface of the hollow cylinder, the o-ring steps having a diameter greater than the depression diameter.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
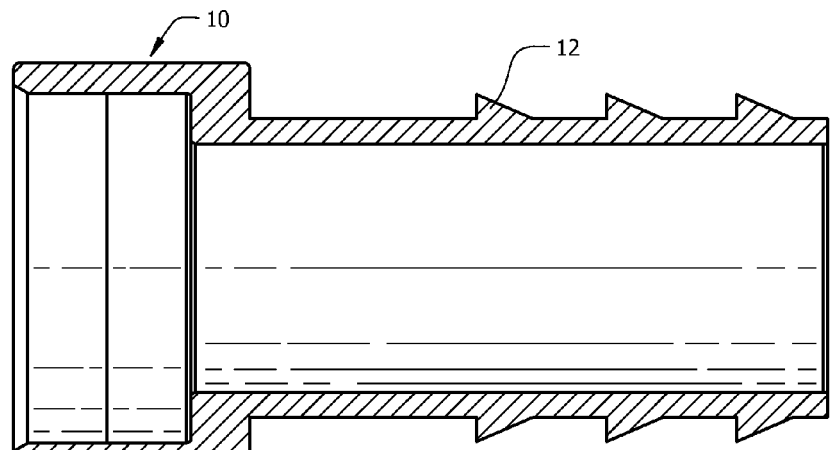
FIG. 1 illustrates a cross-sectional view of the prior art.

Reference will now be made in detail to the presently preferred embodiments of the invention, examples of which are illustrated in the accompanying drawings. Throughout the following detailed description, the same reference numerals refer to the same elements in all figures.

Figure 2:
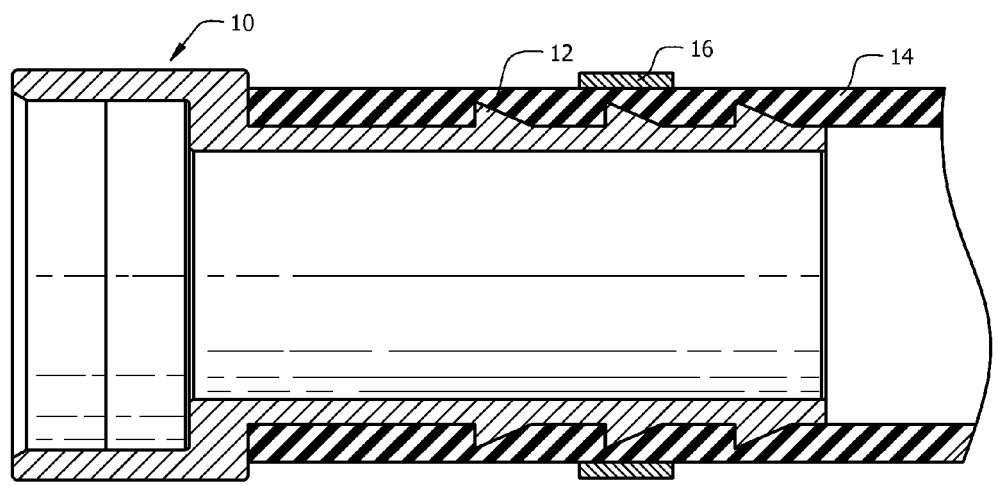
FIG. 2 illustrates a cross-sectional view of the prior art, including a hose.

Referring to FIGS. 1 and 2, a cross-section of the prior art hose fitting 10 is shown. Prior art fittings included barbs 12 that dig into the hose 14. A hose 14 is installed on the prior art fitting, as shown in FIG. 2, a clamp 16 is installed over the hose, compressing the hose. For some hoses, a locking band or hose clamp is used for clamp 16, and for other hose a ferrule (i.e. a circular ring of metal that is compressed around the hose) is used for clamp 16, as known in the industry.

To attach a ferrule, it is compressed radially (i.e., radial crimping) or parallel (i.e., parallel crimping) to the hose. In some embodiments the multiple application fitting is held to the hose using radial crimping, and in other embodiments it is held using parallel crimping.

Radial crimping results in compression of the ferrule circumferentially, with the compressed portion encircling the hose at one or more locations. In prior art fittings, ideally the locations of radial crimping/compression are coincident with locations between barbs 12. As discussed, compression of the hose on top of the barb often causes damage. In the multiple application fitting, ideally the locations of radial crimping are coincident with the o-ring 24 locations.

Parallel crimping results in compression along the length of the hose. In the prior art fitting 10, parallel crimping often causes problems because the hose 14 is compressed against the barbs as well as the space between. In the prior art this compression of the hose directly over the barbs often causes damage to the hose.

Pressure from the clamp 16 presses the hose 14 against the fitting 10 and/or barbs 12, providing a seal. Unfortunately, that same pressure often causes barbs 12 to pierce the inside wall of the hose 14, weakening the hose 14 by undermining coupling integrity and making it difficult to remove the hose 14 from the fitting 10 without cutting the hose 14.

The fitting interface end 10 is any end as known in the art including; threaded ends, quick connect ends, ends with a captive nut to facilitate tightening/loosening, compression end, soldering end, etc.

While the barbs 12 effectively hold the hose 14 on the prior art fitting 10, the barbs 12 damage the hose 14 by scraping and scratching the inside wall, protruding through the inner layer of a multiple layer hose, and making it difficult to remove the hose 14 without causing irreversible damage, rendering the hose end useless. For hose and fitting combinations with high pressure carrying capability, the barbed fittings may require tools for installation.

Figure 3:
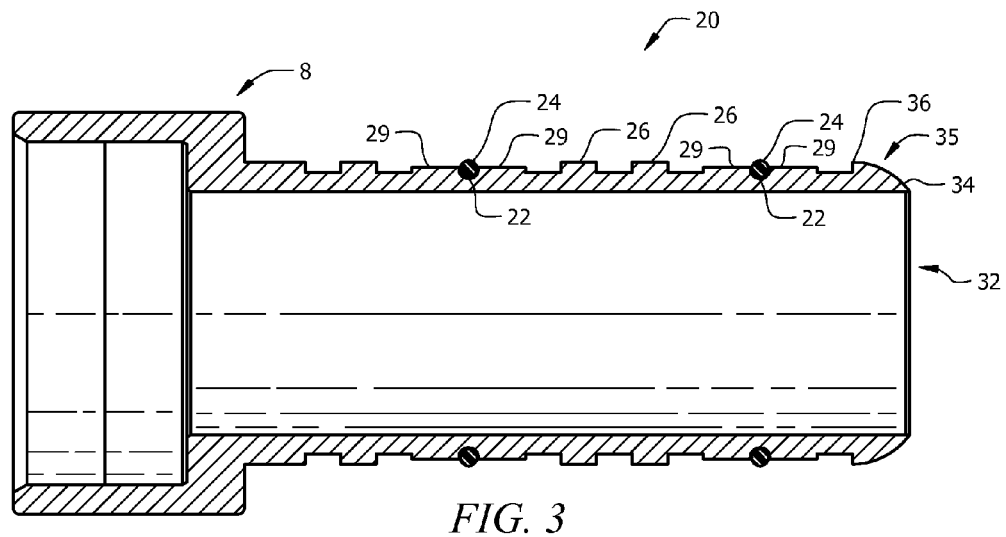
FIG. 3 illustrates a cross-sectional view of one embodiment of the device with o-rings.
Figure 4:
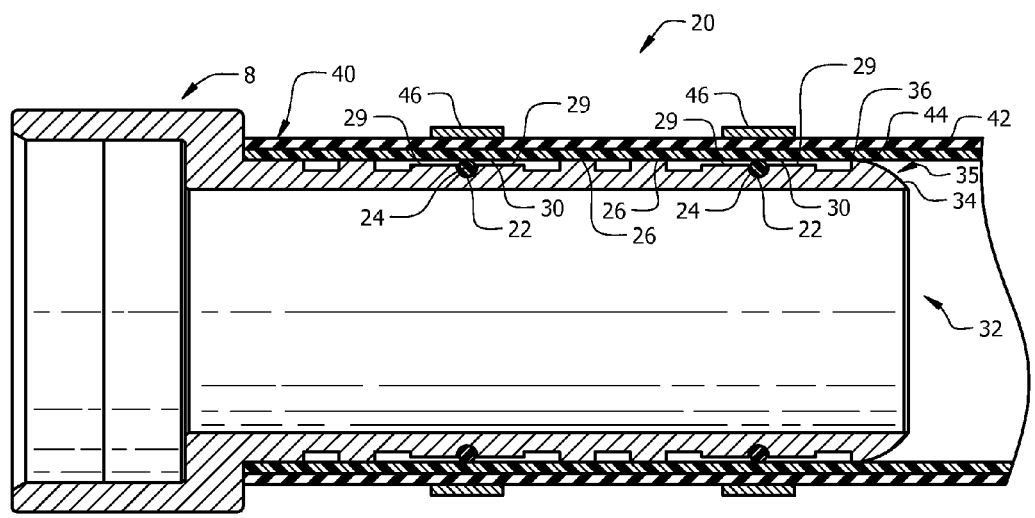
FIG. 4 illustrates a cross-sectional view of one embodiment of the device with o-rings, including a multi layered hose.

Referring to FIGS. 3 and 4, a cross-section of the applicant's multiple application fitting 20 with o-rings is shown. The multiple application fitting 20 includes o-ring grooves 22, with this embodiment having two o-ring grooves 22. Any other number of o-ring grooves 22 is anticipated. Some embodiments include multiple o-ring grooves 22 immediately adjacent to each other for applications that require greater surface area for sealing. The present embodiment of the device also includes a taper 35 that surrounds the insertion end 32. The taper has two diameters; a smaller diameter at the insertion surface 34, and a larger diameter at the taper step 36. This embodiment also includes o-ring steps 26 that preferably lie between each set of o-ring grooves 22. In this embodiment, two o-ring steps 26 are shown between the o-ring grooves 22, but in other embodiments there is only a single step 26, and in still other embodiments there are three or more steps 26. In some embodiments the presence of the two or more o-ring steps 26, rather than only one o-ring step 26, is beneficial because compression of the hose 50 results in some of the hose 50 material flowing into the gap between the o-ring steps 26, resulting in an additional seal. This additional seal provides additional tensile strength of the fitting 8 to hose 50 connection, making it more difficult for the fitting 8 to be pulled from the hose 50.

In contrast to the prior art, where barbs are present before each set of o-ring grooves 22, applicant's device uses o-ring steps 26 with smooth tops. In the present embodiment the top of each o-ring step 26 is shown as flat, but in other embodiments is rounded, ridged, etc. The important differentiation is that there are no sharp barbs pressing against the inside surface of the hose 40 (see FIG. 4).

The diameter at the taper step 36, and o-ring steps 26, is greater than the diameter on either side of the o-rings grooves 22, with the portion of the fitting 20 that lies on either side of the o-ring groove 22 being the o-ring groove depression 29. This greater diameter created by the taper step 36 and o-ring steps 26 slightly stretches the hose 40 during installation, guiding it over the top of the o-rings 24, preventing the hose 40 from pushing the o-rings 24 out of the o-ring grooves 22 as the hose 40 is pushed over the multiple application fitting 20. The stretching of the hose 40 by the taper step and/or o-ring steps creates a gap 30 between the hose 40 and the surface of the fitting near the o-ring grooves 22. The diameter of the multiple application fitting 20 at the location of the o-ring groove depression 29 is less than the diameter at the taper step 36, and/or the diameter at the o-ring steps 26. This lesser diameter allows the hose 40 to slide over the top of the o-ring 24, as described above. Because the multiple application fitting 20 does not require that the fitting itself greatly stretch the hose 40 in order to provide a seal, or that sharp barbs penetrate/distort the inner hose wall 4244, the small amount of stretching caused by the taper and/or step does not hamper insertion of the multiple application fitting 20 into the hose 40. It is envisioned that no insertion tools are required when using the multiple application fitting 20 with most common hose sizes. Applications for the multiple application fitting 20 with o-rings include cross-linked polyethylene tubing (i.e., PEX or XLPE tubing), as well as other hose and tubing types.

The o-ring groove 22 has two relevant diameters; a groove diameter and an installed o-ring diameter. The groove diameter is the diameter from the bottom of the depression of the o-ring groove 22, across the multiple application fitting 20 through the fitting centerline. The installed o-ring diameter is the diameter from the top of an installed o-ring 24, across the multiple application fitting 20 through the centerline. The installed o-ring diameter is greater than the groove diameter by an amount twice the cross-sectional diameter of the o-ring 24. (Note that the cross-sectional diameter of the o-ring 24 will decrease slightly in its installed state as compared to its relaxed state due to some stretching and thinning). The groove depth is the approximately one-half the diameter of a cross-section of the o-ring groove 22. Therefore, in some embodiments approximately one-half of the o-ring 24 lies within the o-ring groove 22, and approximately one-half protrudes above the surface of the o-ring groove depression 29.

The fitting interface end 8 is any end as known in the art including; threaded ends, quick connect ends, ends with a captive nut to facilitate tightening/loosening, compression ends, soldering ends, etc.

FIG. 4 shows the applicant's device with a multiple layer hose 40 installed. This embodiment shows the multiple layer hose 40 having two layers 42/44: an outer layer of material 42 that is commonly composed of rubber, and an inner lining layer 44 that is commonly composed of plastic. A multi-layered hose 40 with a plastic lining is often referred to as a "veneer hose." It is not required that the hose 40 be composed of multiple layers, though that is a common embodiment. The multiple application fitting is equally effective with single layer hoses. All other hose materials and layer quantities are anticipated as known in the industry.

After the hose 40 is installed, band clamps 46 are installed to compress the hose 40 against the o-rings 24 to provide a tight seal. For hose and fitting combinations with high pressure carrying capability, barbed fittings may require tools for installation. Ferrules are preferred for thicker hose 40 to provide more compression than a hose clamp 46. When compressing rubber hose 40 using a clamp 46, typically the wall thickness of the portion of the hose 40 compressed under the clamp 46 is one-third less than the wall thickness of the uncompressed hose 40. Compression greater than this amount often leads to hose damage, while compression less than this amount is sometimes insufficient to provide proper sealing. All other means of securing the hose 40 to the fitting are anticipated, including bands, clamps, tying, cable tie, shrink-fit, ferrules, etc.

The multiple application fitting 20 uses o-rings 24 for some hoses 40 of multiple layers because the innermost layer 44 of these multiple layer hoses 40 is composed of a material that does not readily seal against metal fittings. A single layer rubber hose 40, or a hose 40 with an innermost layer of rubber, provides a tight seal against a metal fitting without the use of o-rings 24 because the rubber hose 40 material expresses, or squeezes, into the o-ring groove 22. This is different in a hose with a stiffer plastic lining 44 that generally requires at least one o-ring 24 to maintain a proper seal. The o-ring 24 interfaces with the stiffer plastic lining 44 providing a tight seal between the rubber o-ring 24 and the plastic lining of the hose 40, and the o-ring 24 interfaces with the multiple application fitting 20 providing a tight seal. Although not required, the o-ring 24 is optionally used with a hose 40/50 (see FIG. 6) that has an innermost layer 44 of rubber, or is entirely rubber. In some embodiments, hoses 40 with inner layers of material other than plastic require the use of o-rings 24 to achieve a proper seal.

Figure 5:
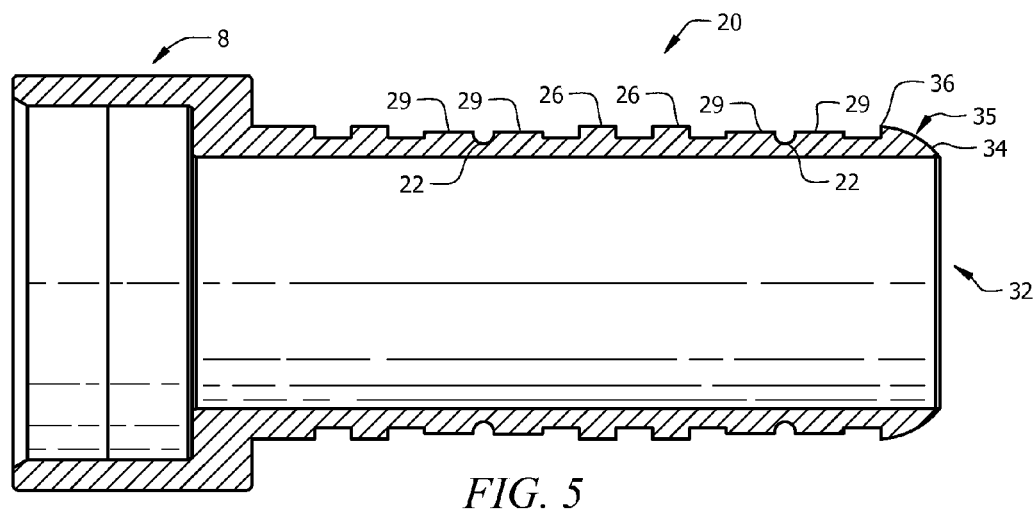
FIG. 5 illustrates a cross-sectional view of one embodiment of the device without o-rings.
Figure 6:
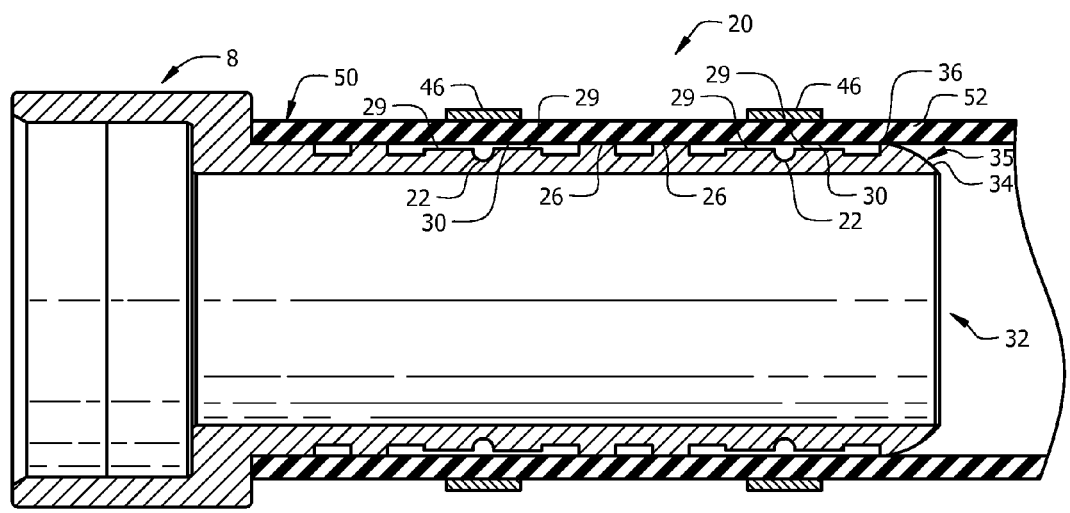
FIG. 6 illustrates a cross-sectional view of one embodiment of the device without o-rings, including a hose.

Referring to FIGS. 5 and 6, the multiple application fitting 20 is shown without o-rings. The multiple application fitting 20 includes a taper 35 that surrounds the insertion end 32. The taper has two diameters; a smaller diameter at the insertion surface 34, and a larger diameter at the taper step 36. This embodiment also includes o-ring steps 26 that preferably lie between each set of o-ring grooves 22. In this embodiment two o-ring steps 26 are shown between the o-ring grooves 22, but in other embodiments there is only a single step 26, and in still other embodiments there are three or more steps 26. In some embodiments the presence of the two or more o-ring steps 26, rather than only one o-ring step 26, is beneficial because compression of the hose 40 results in some of the hose 40 material flowing into the gap between the o-ring steps 26, resulting in an additional seal. This additional seal creates additional tensile strength in the fitting 8 to hose 40 connection, making it more difficult for the fitting 8 to be pulled from the hose 40. The o-ring groove depression 29 is the portion of the multiple application fitting 20 that lies on either side of the o-ring groove 22. The diameter of the multiple application fitting 20 at the location of the o-ring groove depression 29 is less than the diameter at the taper step 36, and/or the diameter at the o-ring steps 26. This lesser diameter allows for the hose 50 to slide over the top of the o-ring 24, when an o-ring 24 (not shown) is installed, as described above. For hose 50 having a rubber (or similar) inner surface, o-rings 24 are not required. A gap 30 is present when the hose 50 is in its relaxed state. In this example, the hose 50 is shown composed of a single layer of material, such as rubber 52. All other hose materials are anticipated as commonly known in the industry.

The decision of whether to use the multiple application fitting 8 with o-rings 24 or without o-rings 24 depends on how the user wishes the seal to be created. When an o-ring 24 is present, and a hose 40/50 is compressed on top of the multiple application fitting 24, the o-ring is impressed into the hose to create a seal, generally applicable when using a hose with a rubber lining. When an o-ring 24 is absent, and a hose 40/50 is compressed on top of the multiple application fitting 24, the hose 40/50 material itself expresses into the o-ring groove 22 where the o-ring would be present, if installed, generally applicable with a hose with veneer, or similar, lining. The greater flexibility of a rubber hose, especially at the inner wall, eliminates the need for an o-ring 24 (not shown). It is anticipated that some multi-layer hoses will retain sufficient flexibility to be used with the multiple application fitting 20 without the use of an o-ring, much like the single layered rubber hose. The decision of whether to use the multiple application fitting 8 with o-rings 24 or without o-rings 24 depends on how the user wishes the seal to be created. When an o-ring 24 is present, and a hose 40/50 is compressed on top of the multiple application fitting 24, the o-ring is impressed into the hose to create a seal. When an o-ring 24 is absent, and a hose 40/50 is compressed on top of the multiple application fitting 24, the hose 40/50 material itself expresses into the o-ring groove 22 where the o-ring would be present, if installed. After a hose 50 is installed, band clamps or ferrules 46 are installed to compress the hose to provide a tight seal. As before, any form of clamp or ferrules is anticipated to close and hold a seal between the hose 50 and the multiple application fitting 20.

Referring to FIGS. 3-6, the general benefits of the multiple application fitting 20 will be described. The multiple application fitting 20 circumvents many of the problems present in the prior art fittings, including barbed fittings, dedicated fittings, and fittings that working only with a specific type of hose or hose material. The integrity of the hose 40/50 is maintained because the multiple application fitting 20 has no sharp barbs to penetrate the inner wall of the hose 40/50. The hose 40/50 is generally removable and reusable because there are no barbs to damage the structural integrity of the hose 40/50. The multiple application fitting 20 is used with or without o-rings 24, depending on the application. Aside from the installation or removal of the o-rings 24, the multiple application fitting 20 remains identical in applications using many different types of hoses 40/50. For example, a user installs the multiple application fitting 20 on a multiple layered hose 40 that requires the use of o-rings 24, then subsequently remove the multiple layer hose 40, removes the o-rings 24, and installs the same fitting 20 on a single layer rubber hose 50. This versatility reduces the quantity of fittings a supplier needs to keep on hand. Because the sealing properties of the hose 40/50 are not dependent on the hose 40/50 having a large compressive force against the fitting, generally the fitting is inserted without the use of tools. In the prior art, for hose and fitting combinations with high pressure carrying capability, barbed fittings may require tools to install. This makes the multiple application fitting 20 more practical for use in the field because less hardware is needed, and more economical because it does not require expensive installation tools beyond those already possessed by a typical installer.

Additionally, if the multiple application fitting 8 is attached with a ferrule, the ferrule is compressed using either radial crimping or parallel crimping. The ability to use either type of compression exists because there are no barbs on the multiple application fitting, and thus compression along the length of the hose will not cause damage. This is unlike the prior art, where such compression across barbs sometimes damages the sealing integrity of the hose.

Referencing related application Ser. No. 12/336,723, now U.S. Pat. No. 8,342,578, in some embodiments a clamp guide is used to ensure proper placement of the clamps 46 over the o-rings for optimal sealing. Referencing related application Ser. No. 12/634,882, now U.S. Pat. No. 8,302,283, in some embodiments a clamp tool is used to ensure proper placement of the clamps 46.

Figure 7:
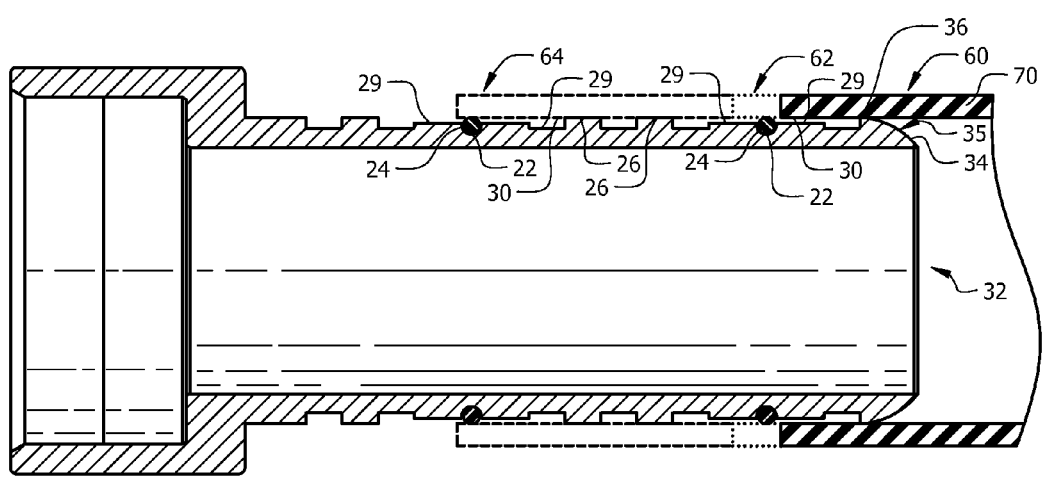
FIG. 7 illustrates a cross-sectional view of one embodiment of the device with o-rings, shown during installation of a hose.

It is important to note that the shape of any given edge on the fitting 20 is not critical. For example, the o-ring groove 22 is not required to be a half-circle as illustrated, and in other embodiments the o-ring groove 22 is square, or triangular. The edges of the o-ring steps 26 are not required to be 90 degrees, and in other embodiments the o-ring steps 26 are rounded, or chamfered. The o-ring steps 26 are also not required to be separate protrusions, and in other embodiments the o-ring steps 26 are a single protrusion. Referring to FIG. 7, the benefits of the multiple application fitting 20 during installation are shown. When the hose 70 is first placed over the insertion end 32, the diameter of the hose 70 is slightly stretched by the taper step 36, as shown in position 60. This creates a gap 30 between the hose 70 and the o-ring groove depression 29. The hose 70 substantially maintains this larger diameter as it moves from position 60 to position 62. This minimizes the possibility of the hose 70 pushing the o-ring 24 out of the first o-ring groove 22. Note that it is not necessary that the increase in diameter be large enough to prevent the hose 70 from contacting the o-ring 24. Rather, the increase in diameter need only be sufficient to prevent the hose 70 from contacting the o-ring 24 at an angle that leads to dislodgement of the o-ring 24. The taper step 36 diameter and o-ring step 26 diameter are selected to stretch the hose 70 enough such that the hose 70 contacts the o-ring 24 above the centerline of the o-ring 24. This minimizes any lateral forces, leaving the o-ring 24 within the o-ring groove 22. Given that the o-ring 24 is only partially exposed, with approximately half of the o-ring 24 disposed within the o-ring groove 22, the lateral force from the hose 70 is insufficient to unseat the o-ring 24 from its groove 22. This contrasts with the prior art, in which the o-ring 24 sits substantially beneath the surface of the fitting to avoid being pushed out, or the o-ring 24 has a flat portion lying against the surface of the fitting to prevent it from rolling. As the hose 70 continues to be applied to the multiple application fitting 20, the taper steps 26 slightly stretch the hose 70 to guide it over subsequent o-rings 24.

Referring to FIGS. 3 and 4, the dimensions of an example embodiment will be described. This sample embodiment is intended for veneer lined hose 40 with an inner diameter (ID) of 0.625". For this embodiment, the outer diameter (OD) of the multiple application fitting 20 at the o-ring groove depression 29 is 0.625", the same as the ID of the hose 40. At the taper step 36 and the o-ring steps 26 the OD is 0.645", slightly greater than the ID of the hose 40. The OD at the innermost point of the o-ring grooves 22 is 0.583". The o-ring groove 22 itself has a radius of 0.020", the same as the radius of the o-ring 24, when the o-ring 24 is in its relaxed, pre-installation state. The o-ring groove depressions 29 have an OD of 0.605" in this embodiment. The ID of the multiple application fitting 20 in this embodiment is approximately 0.531".

Referring to FIGS. 3 through 6, the dimensional relationships of an example embodiment will be described. For the purposes of this embodiment, comparisons will be made to a hose 40/50 with "D" representing the inner diameter of the hose 40/50. The diameter at the taper step 36 is greater than D to slightly stretch the hose while the multiple application fitting 20 is being inserted and prevent pushing o-ring 24 out of o-ring groove 22. If an o-ring step 26 is present, the diameter at the o-ring step 26 is also greater than D to slightly stretch the hose before contacting the o-rings 24 beyond the first o-ring 24. The diameter at the o-ring depression 29 is less than the diameter at either the taper step 36 or the o-ring step 26, creating a gap 30.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A multiple application fitting for joining a hose to a fitting interface end, the multiple application fitting comprising:

a hollow cylinder, the hollow cylinder having an inside surface, an outside surface, a distal end, and a proximal end, the distal end having a fitting interface end, the proximal end having a taper, the taper having a taper step and an insertion surface;

one or more o-ring grooves, each o-ring groove circumferentially encircling the hollow cylinder, each o-ring groove having a groove depth, and a groove diameter;

o-ring groove flats on each side of each o-ring groove, a first side of each o-ring groove flat bordering one of the o-ring grooves, each o-ring groove flat having a diameter, a second side of each o-ring groove flat bordered by a groove, the diameter of the grooves being less than the diameter of the flats; and o-ring steps on the outside surface of the hollow cylinder, the o-ring steps having an o-ring step diameter greater than the diameter of the flats each groove bordered by either one of the o-ring steps or the taper.

2. The multiple application fitting for joining a hose to a fitting interface end of claim 1, wherein the groove depth is one-half a cross-sectional diameter of an appropriately sized o-ring.

3. The multiple application fitting for joining a hose to a fitting interface end of claim 1, where the one or more o-ring grooves is two o-ring grooves.

4. The multiple application fitting for joining a hose to a fitting interface end of claim 1, wherein the taper step has a diameter greater than the diameter of the flats such that a hose does not displace an o-ring during hose installation.

5. The multiple application fitting for joining a hose to a fitting interface end of claim 1, wherein the o-ring grooves have a semi-circular cross sectional shape.

6. The multiple application fitting for joining a hose to a fitting interface end of claim 5, wherein an entire surface of each of the o-ring steps has the o-ring step diameter such that the surface of each of the o-ring steps is substantially parallel to the longitudinal axis of the hollow cylinder.

7. The multiple application fitting for joining a hose to a fitting interface end of claim 5, further comprising an o-ring, the o-ring located within one of the o-ring grooves with a portion of the o-ring protruding outside of the one of the o-ring grooves.

8. A multiple application fitting for joining a hose to a fitting interface end, the multiple application fitting comprising:
- a hollow cylinder, the hollow cylinder having an inside surface, an outside surface, a distal end, and a proximal end, the distal end having a fitting interface end, the proximal end having a taper, the taper having a taper step and an insertion surface, the taper step having a taper step diameter;
- two o-ring grooves, each of the o-ring grooves circumferentially encircling the hollow cylinder, the o-ring grooves having a groove depth, and a groove diameter;
- four o-ring groove flats, the o-ring groove flats having an depression diameter, and one of the o-ring groove flats being at each side of each of the o-ring grooves;
- four grooves, each groove abutting one of the o-ring groove flats, the grooves having a diameter less than the diameter of the flats; and
- three o-ring steps on the outside surface of the hollow cylinder, each of the o-ring steps having a diameter greater than the diameter of the flats, each o-ring step positioned next to a groove of the four grooves.

9. The multiple application fitting for joining a hose to a fitting interface end of claim 8, wherein the groove depth is one-half a cross-sectional diameter of an appropriately sized o-ring.

10. The multiple application fitting for joining a hose to a fitting interface end of claim 8, where the taper step diameter is greater than the diameter of the flats.

11. The multiple application fitting for joining a hose to a fitting interface end of claim 10, wherein each of the three o-ring steps has a flat surface that is substantially parallel to the longitudinal axis of the hollow cylinder.

* * * * *